United States Patent [19]

Hermans et al.

[11] Patent Number: 5,224,831
[45] Date of Patent: Jul. 6, 1993

[54] FAN BLADE PROTECTION SYSTEM

[75] Inventors: Thomas C. Hermans, Cincinnati, Ohio; Thomas G. Wakeman, Laurenceburg, Ind.; Ambrose A. Hauser, Wyoming, Ohio

[73] Assignee: General Electric Company, Cincinnati, Ohio

[21] Appl. No.: 877,351

[22] Filed: Apr. 30, 1992

Related U.S. Application Data

[63] Continuation of Ser. No. 592,737, Oct. 4, 1990, abandoned.

[51] Int. Cl.$^5$ ............................................... B63H 5/10
[52] U.S. Cl. .................................... 416/129; 416/238; 416/170 R
[58] Field of Search ............... 416/124, 126, 129, 130, 416/204 A, 128, 238, 244

[56] References Cited

U.S. PATENT DOCUMENTS

| | | | |
|---|---|---|---|
| 2,186,064 | 1/1940 | Dekker | 416/238 |
| 3,727,998 | 4/1973 | Haworth et al. | 416/170 R |
| 4,767,271 | 8/1988 | Catlow | 416/171 |
| 4,826,403 | 5/1989 | Catlow | 416/171 |
| 4,915,586 | 4/1990 | Williams | 416/129 |

FOREIGN PATENT DOCUMENTS 2192237  1/1988  United Kingdom ............... 416/171

Primary Examiner—Thomas E. Denion
Attorney, Agent, or Firm—Jerome C. Squillaro; Charles L. Moore, Jr.

[57] ABSTRACT

In one type of aircraft propulsion system, propeller blades are mounted on a ring which surrounds a turbine. An annular space exists between the turbine and the ring. If a propeller blade should break free, the unbalanced centrifugal load tends to deform the ring. The invention reduces the deformation, as by locating spacers between the turbine and the ring.

13 Claims, 5 Drawing Sheets

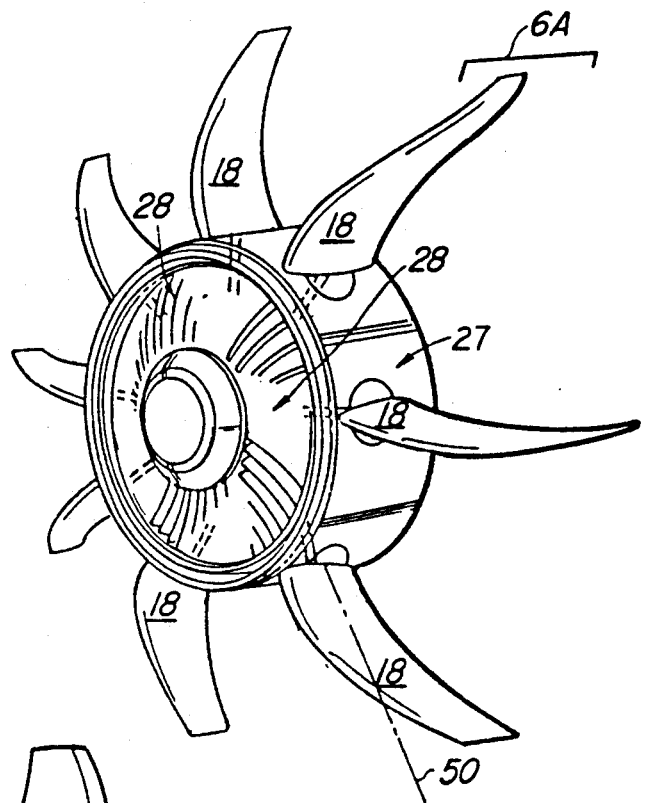
*Fig-3*
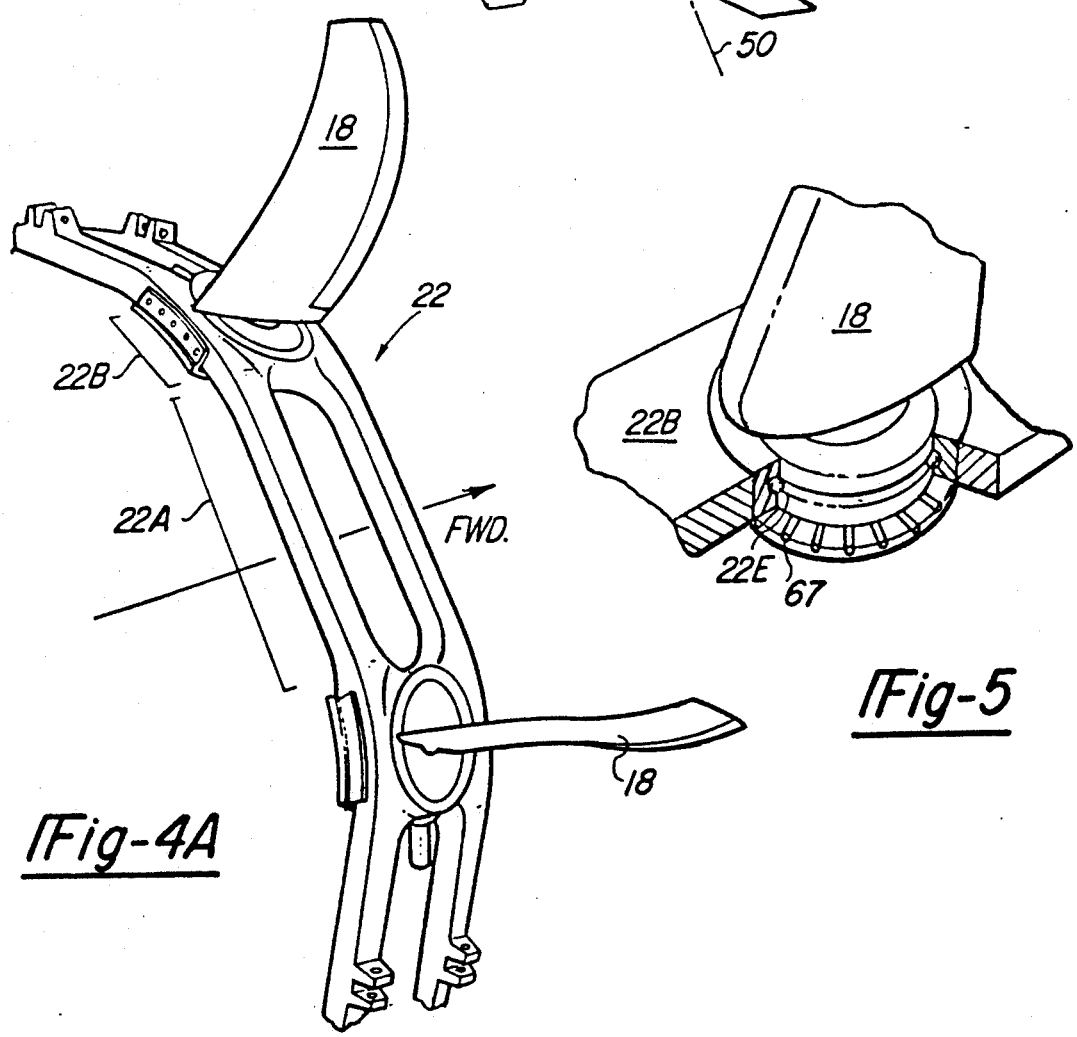
*Fig-4A*
*Fig-5*

FAN BLADE PROTECTION SYSTEM

The invention herein described was made in the performance of work under a NASA contract and is subject to the provisions of Section 305 of the National Aeronautics and Space Act of 1958, Public Law 85-568 (72 Stat. 434; 42 USC 2457).

This application is a continuation of application Ser. No. 07/592,737, filed Oct. 4, 1990, abandoned.

The invention relates to the mounting of propeller blades in aircraft engines and, more specifically, to a mounting system in a counterrotating propeller pair in which the centrifugal load of the propellers is distributed as hoop stress in a ring, the ring in turn being supported by a turbine which the ring surrounds. A series of brackets connects the ring with a frame of the turbine. Should a propeller blade break free, the centrifugal load is no longer distributed entirely as hoop stress, but large bending is introduced into the ring-bracket system, together with high deflections. The stresses and deflections can destroy the ring.

BACKGROUND OF THE INVENTION

FIG. 1 illustrates an aircraft engine 3 of the unducted fan type, in which the invention can be used. Region 6 is shown in cross-sectional schematic form in FIG. 2, wherein contra-rotating turbines 9 (hatched) and 12 (plain) are driven by a hot gas stream 15 provided by a core engine (not shown in detail). The turbines 9 and 12, in turn, drive contra-rotating fan blades 18 and 21 shown in FIGS. 1 and 2. (The term "contra-rotating" means that turbines 9 and 12, as well as blades 18 and 21 to which they are attached, rotate in opposite directions, as shown by arrows 24 and 27 in FIG. 1.) A view of sub-region 6A in FIG. 2 is shown in FIG. 3, and in more detailed form in FIG. 4. The fan blades 18 in FIG. 3 are supported by a structure which is shown as a ring 22 in FIG. 4.

Turbine blades 28 in FIGS. 3 and 4 comprise the turbine stage indicated as 6B in FIG. 2. A casing 24 (shown also in schematic form in FIG. 2) surrounds the turbine blades 28. A carrier, schematically shown as a ring 22 in FIG. 4, supports the fan blades 18 in FIG. 3. During operation, the centrifugal loading of the fan blades 18 is reacted by the ring 22 as a hoop stress.

The actual structure used is not the idealized ring 22 shown in FIG. 4, but is what is termed a "polygonal ring," shown in schematic perspective form in FIG. 4A. The polygonal ring includes two types of sections: one type is the blade support section 22B, also shown in FIG. 5, and which includes a thrust bearing 67 which carries the centrifugal load imposed by the fan blade 18.

The blade support section 22B also includes an alignment bearing 22E which serves to maintain fan blade 18 in correct radial position. Both the thrust bearing and the alignment bearing allow the blade to change in pitch, as discussed below.

The other type of section is a connecting beam 22A which connects neighboring blade support section 22B.

One type of polygonal ring is described in U.S. Pat. No. 4,863,352—Hauser et al., entitled "Blade Carrying Means." This patent is hereby incorporated by reference.

As stated above, the ring 22 in FIG. 4 surrounds a turbine stage 6B. A space, indicated by distance 23, exists between the ring 22 and the casing 24 of the turbine stage. One reason for the space is that the geometries of the components flanking the space are determined by different factors. That is, the design of the fan system, including both blades 18 and cowl 27 in FIG. 2, is determined by factors which are different than those which govern the design of the turbine components, namely, those inward of arrow 31.

A second reason for the existence of the space 23 is that the ring 22 and the casing 24 in FIG. 4 expand differently under centrifugal load. A third reason is that the ring 22 and the casing 24 are subjected to different temperatures during operation. The casing experiences a temperature of about 1,200° F., while the ring 22 experiences a significantly lower temperature of about 500° F. Consequently, the casing 24 expands more than does the ring. In one instance, distance 23A in FIG. 6A was 0.140 inches when all components were at room temperature. At aircraft takeoff, distance 23A shrank to 0.070 inches.

In the event that one of the fan blades 18 should break free during operation, the event shown in FIG. 4B occurs. The centrifugal load imposed on the ring 22 prior to breakage, indicated by arrow 30, suddenly vanishes, indicated by breaking 33. The inward load indicated by arrow 36 which formly balanced the centrifugal load 30 is now unbalanced, and the ring 22 almost instantly deforms into phantom shape 39 and strikes the casing 24. The force of impact between the ring 22 and the casing 24 can be ascertained from a simple example.

It is assumed that the fan diameter, dimension 42 in FIG. 1, is 12 feet. By way of example, it is assumed that each fan blade can be treated as a point mass of weight 54 pounds shown in FIG. 1 by weight 45, and located on the circumference of a circle 46 which is six feet in diameter. It is also assumed that the speed of rotation is 20 revolutions per second, or (2) (pi) (20) radians per second, i.e., about 126 radians per second.

Centrifugal acceleration is $w^2r$, wherein w is angular velocity (radians per second) and r is radius. In this example, the acceleration is about 47,628 feet per second per second:

$$47,628 = 126(1/sec) \times 126(1\ sec) \times 3(feet)$$

Dividing this number by the acceleration due to gravity, 32.2 feet per second per second, gives a quotient of about 1471. The quotient is the g field experienced by the point masses. Stated another way, each point mass 45 (representing the weight of each blade), which originally weighed 54 pounds, now weighs 80,000 pounds under centrifugal force ($1471 \times 54 = 80,000$). Therefore, the balancing force 36 in FIG. 4B is also 80,000 pounds.

When the blade breaks free, the balancing force now acts unopposed in pulling the ring 22 toward phantom position 39. To a first order approximation, the situation is similar to dropping a weight of 80,000 pounds onto the casing 24.

The impact of the ring at region 47 in FIG. 4B can cause damage to the casing 24. More importantly, the deformation of the ring 22 can cause distortion to, and seizure in, the pitch change mechanism, which was not previously discussed.

The pitch change mechanism is that which alters the pitch of the fan blades 18; that is, the mechanism rotates the fan blades about axis 50 in FIG. 3 in order to change the pitch angle of the fan blades. The detailed operation of the mechanism need not be understood here, only that the mechanism must not be permitted to strike the casing 24 because impact with the casing 24 can cause the mechanism to deform, jam or render the mechanism inoperable. The pitch change mechanism must remain operational in order to pitch the remaining blades safely and to prevent overspeed of the propeller with further damage.

Further, the deformation indicated by phantom ring 39 in FIG. 4B is not desirable because the deformation moves the remaining fan blades from their original positions, thus displacing the centroid from its original position. The displacement causes significant imbalance and vibration.

Still further, deformation can break the ring.

OBJECTS OF THE INVENTION

It is an object of the invention to provide a new and improved fan blade mounting system.

SUMMARY OF THE INVENTION

One form of the invention is shown in FIG. 8. In that Figure, a ring 22 surrounds a turbine stage 6A and the ring itself supports an array of aircraft propeller blades 18. There is an annular space 23 between the ring and the turbine casing. Should a blade 18 break free, as shown by broken blade 18B, the now unbalanced centrifugal load on the ring 22 will drive the ring into contact with the casing 24 of the turbine, as shown in dashed circle 200. The invention reduces deformation, and maintains the ring in a nearly circular shape upon blade loss.

In the invention, there is a spacer 60 at the location of each blade 18 for limiting deformation of the ring 22 upon blade breakage. Also, a turbine frame, which is significantly stiffer than the ring 22, is placed directly under the ring 22. The frame supports the ring when the ring contacts the turbine, and prevents further deformation. One may View the load at the point of contact between the ring and the frame as simulating the load originally applied by the now-missing blade.

BRIEF DESCRIPTION OF THE DRAWING

FIG. 3 illustrates region 6A in FIG. 2, in perspective view.
FIG. 4A illustrates in schematic form the ring 22 in FIG. 4.
FIG. 5 illustrates bearings 67 and 22E associated with the ring in FIG. 4A.

DETAILED DESCRIPTION OF THE INVENTION

Figures 4, 4B:
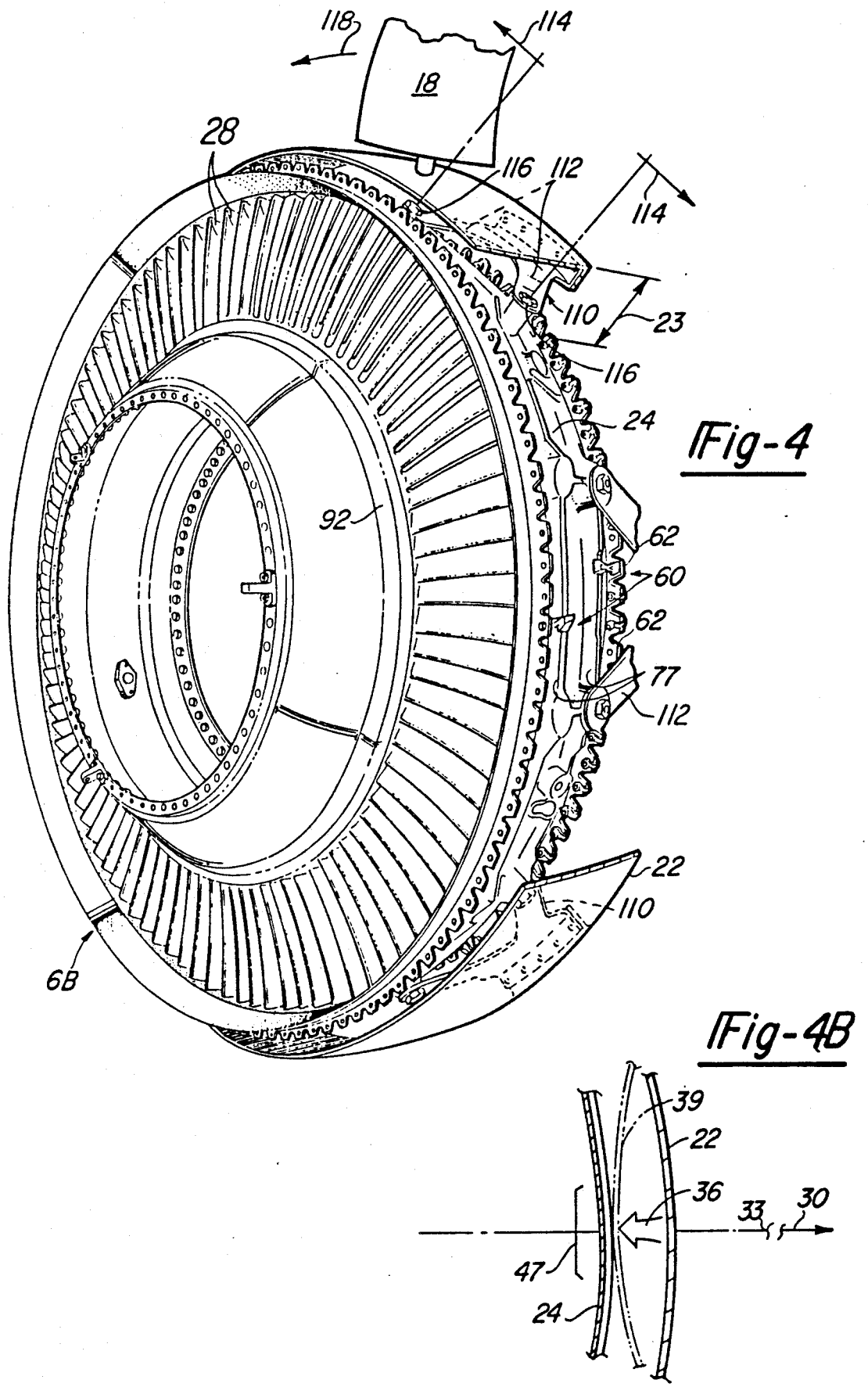
FIG. 4 illustrates FIG. 3 in more detail.
FIG. 4B illustrates deformation of the ring 22 in FIG. 4.

In overly simple terms, the invention comprises a spacer 60 in FIG. 4 which reduces distance 23. The following discussion describes the invention in more detail.

Figure 1:
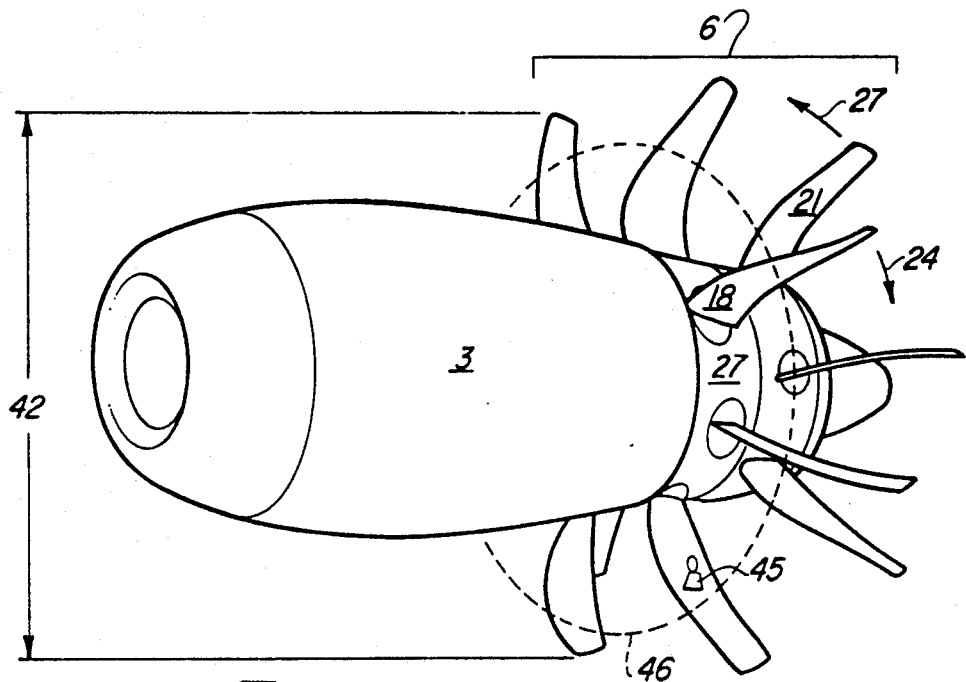
FIG. 1 illustrates an unducted fan engine.
Figure 2:
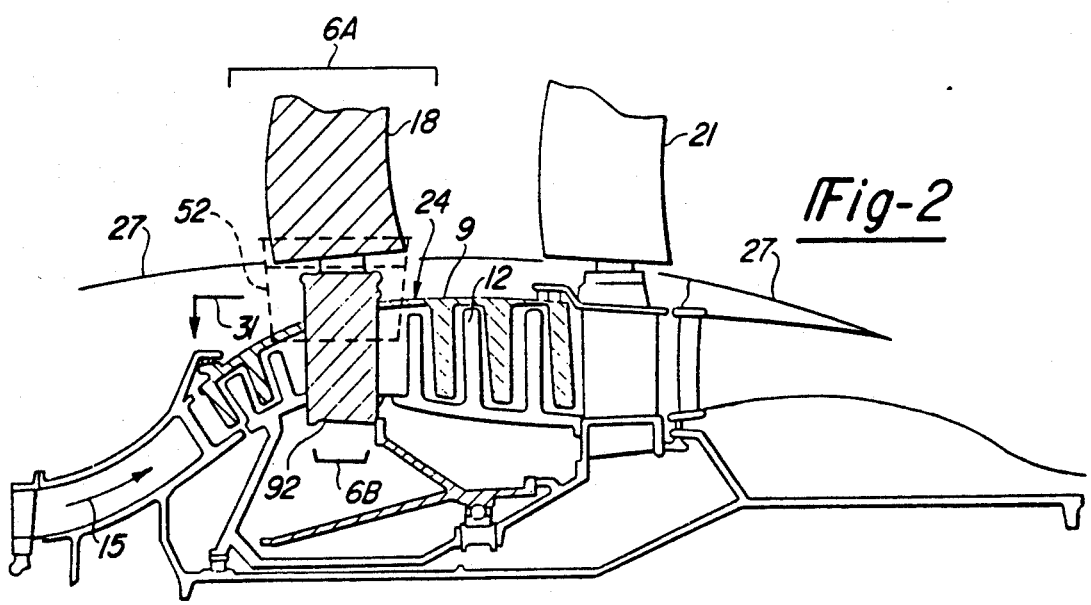
FIG. 2 illustrates region 6 in FIG. 1.
Figure 6:
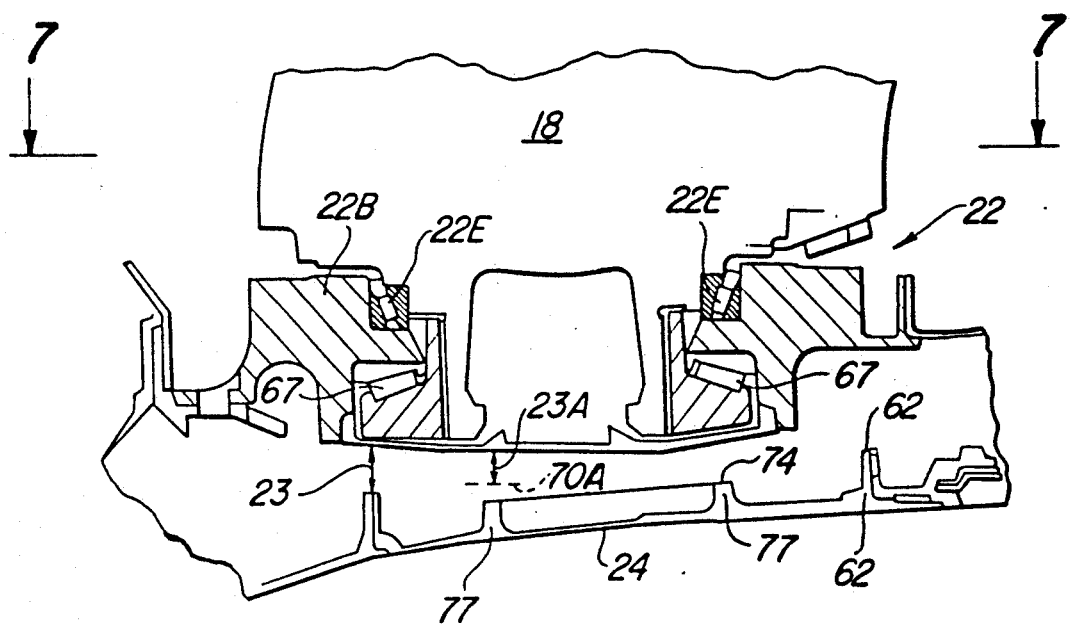
FIG. 6 illustrates region 52 in FIG. 2.
Figure 6A:
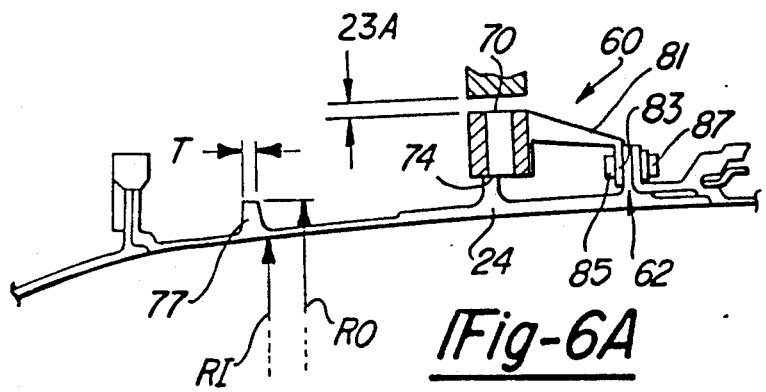
FIG. 6A illustrates part of FIG. 6, with one form of the invention installed and labeled with numeral 60.
Figure 9:
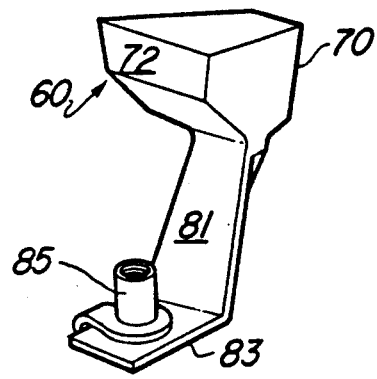
FIG. 9 illustrates one form of the invention.

FIG. 6 illustrates region 52 in FIG. 2. Casing 24 corresponds to casing 24 shown in both FIGS. 2 and 4. Bearings 67 correspond to bearings 67 in FIG. 5. Fan blade 18 is shown in FIG. 6. A spacer 60 in FIG. 6A, shown in greater detail in FIG. 9, is bolted to a flange 62 (also shown in FIG. 4) and provides a bearing surface 70. Surface 72 in FIG. 9 rests atop the outer edge 74 of a stiffening rib 77 in FIGS. 6 and 6A. Surface 70 in FIG. 9 provides a bearing surface 70 in FIG. 6 for transmitting load from the ring 22 (shown in FIG. 6) to casing 24 when ring 22 deforms. A leg 81 in FIG. 9 connects the spacer 60 with a foot 83. The foot 83 contains a thread 85 to which a bolt 87 (shown in FIG. 6A) can mate in order to fasten the foot 83 to rib 62 in FIG. 6.

Figure 7:
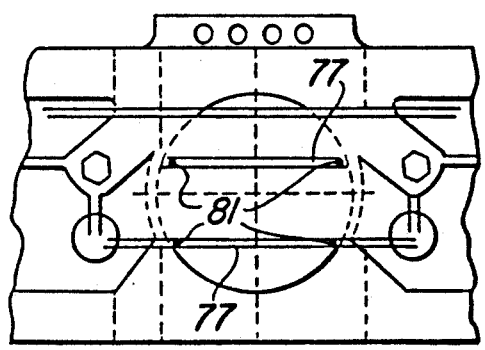
FIG. 7 is a view of the device of FIG. 6, taken along lines 7—7.

The spacer 60 is also shown in FIG. 4 at about the three o'clock position. The spacer 60 is constructed of Inconel 718 in a manner known in the art. The spacer transmits load from the blade support link 22B, as shown in FIG. 6, when a blade 18 is lost, to annular rib 77. Preferably, there are four such spacers for each blade. They are positioned so that bearing surfaces 70 in FIG. 6A are located at points 81 in FIG. 7.

The spacer 60 functions to effectively reduce distance 23 in FIG. 6 to distance 23A. Dashed line 70A indicates the location of surface 70 in FIG. 6 when the spacer 60 is installed. Distance 23A is established by transient growths of the turbine and rings and set to just contact in worst transient.

The stiffening ribs 77 in FIG. 6 are shown more clearly in FIG. 4. The ribs are contained on the outer annular casing 24 of turbine stage 6B. Stage 6B contains turbine blades 28 which extend from the outer casing 24 to an inner barrel 92. The turbine blades 28 act as a web and can transmit a load from casing 24 to inner barrel 92. Casing 24 is schematically shown in FIG. 2, as is barrel 92. The ribs 77 in FIG. 6A resemble annular discs having an inner radius RI in FIG. 6A, an outer radius RO and a thickness T.

Figure 10:
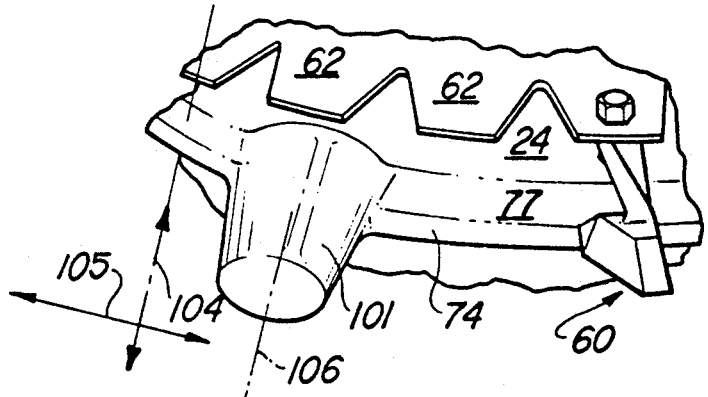
FIG. 10 illustrates the invention of FIG. 9 togehter with a second embodiment.

In another form of the invention, boss 101 in FIG. 10 replaces spacer 60. The bosses are formed into the outer casing 24. Again, as in the case of FIG. 7, there are four bosses per fan blade. The bosses are connected to the ribs: for example, stiffening rib 77 runs nearly through the center of boss 101. Restated, the bosses can be viewed as a thickening of stiffening rib 70 in the axial directions (that is, directions 104 and 105) and an extension in the radial direction (direction 106). Stiffening ribs 77 themselves lie approximately in a radial plain of the turbine stage.

An invention has been described wherein a gas turbine stage surrounded by a casing 24 is further surrounded by a ring 22 which in turn carries the centrifugal load of propulsor fan blades 18.

The ring 22 in FIG. 4 is connected to the casing 24 by forked brackets 110. Pairs of legs 112 form each fork. The forked brackets accommodate thermal expansion of the casing, which increases the circumference of the casing relative to the ring 22, which maintains a substantially constant circumference.

When the casing expands, the legs 112 are spread apart, indicated by arrows 114, thus deforming the brackets slightly. In this sense, the brackets 110 provide a floating mount for the ring 22. The thrust load provided by the propellers, and indicated by arrow 118, is reacted by a shear load on bolts 116. Upon loss of a blade, the deformation of ring 22 shown in FIG. 4B occurs, because the brackets themselves are not stout enough to resist bending of the ring. The spacers 60 limit the travel of the ring 22 and thereby prevent contact between the ring 22 and the casing 24, the contact being illustrated in FIGS. 4B and 8.

Restated, the centrifugal load is reacted by hoop stresses within the ring. There is a space 23 between the turbine casing and the ring. Spacers, or anvils 60, are located between the casing and the ring at the regions where fan blades are located. Should a fan blade break loose during operation, the inward travel of the ring near the broken blade is restricted by the spacers.

That is, the ring does not travel fully inward and contact the casing, but travels only far enough to reach the spacers. In this manner, the impact energy upon the casing is reduced, because the distance over which inward force is applied is reduced. (The impact energy is a function of not only the force applied, but also the distance traveled.)

In addition, dynamic balance of the system is not so severely degraded as it would be without the presence of the spacers. That is, the circular shape of the ring is more nearly preserved. This preservation further allows a greater probability that the pitch changing mechanism for the fan blades will remain operational, thus allowing the pitch to be changed and control over the propulsion system to be maintained.

Figure 8:
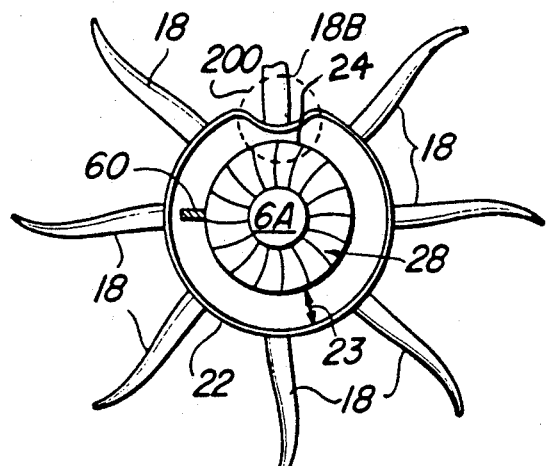
FIG. 8 illustrates in schematic form the deformation of ring 22 which occurs upon blade loss.

From another point of view, the invention has virtually no function during normal operation of the engine system: only when a blade part disconnects from the ring 22 does the anvil 60 serve a purpose, namely, of preventing loss of the space 23 in FIG. 8 between the ring 22 and casing 24.

That is, upon blade loss, inward motion of the ring 22 as described in connection with FIG. 4B becomes unrestrained. The ring itself is not sufficiently stiff to maintain a circular shape upon blade loss. Restraint was provided prior to blade loss by the centrifugal force of the blade.

Numerous substitutions and modifications can be undertaken without departing from the true spirit and scope of the invention as defined by the following claims.

Figure 11:
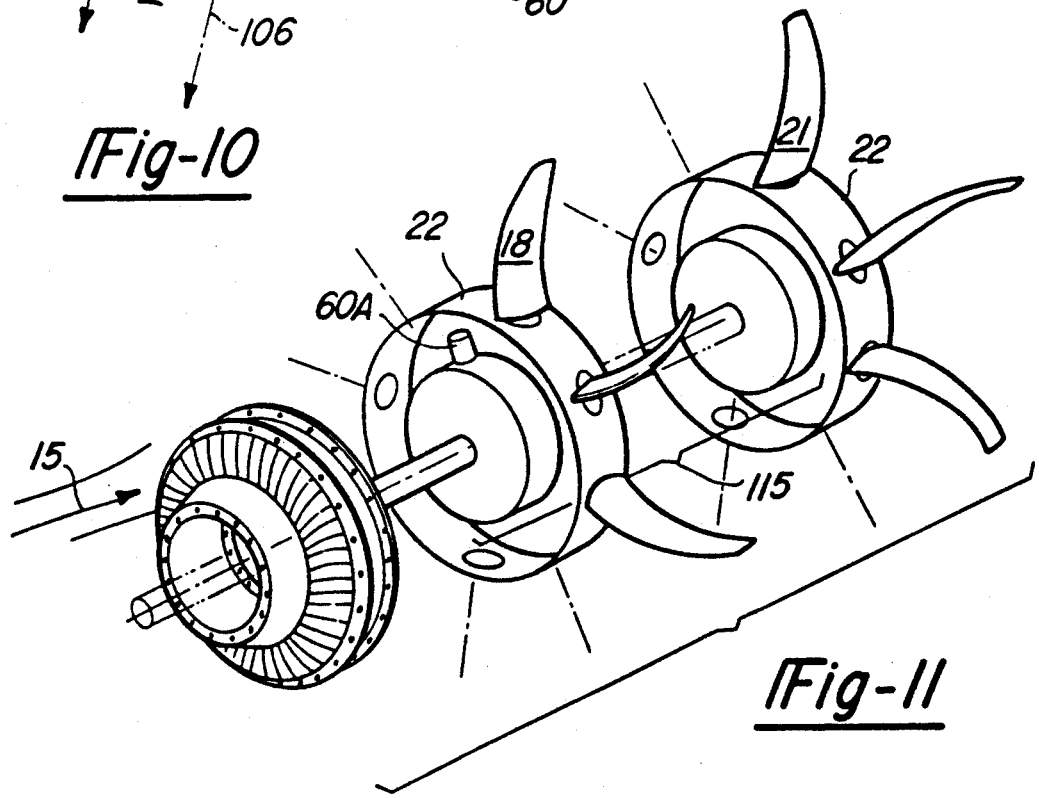
FIG. 11 illustrates in schematic form a system in which a high-speed turbine drives a speed-reducing gear system which, in turn, drives propellers 18 and 21, which are carried by rings 22 which surround the gear system.

For example, the invention has been described in terms of spacers 60 associated with a ring 22 which is attached to and rotates at the same speed as a turbine casing 24. However, in some situations, such a direct-drive arrangement may not be desirable. For example, the turbines 9 and 12 in FIG. 2 may be replaced by a high-speed turbine system in FIG. 11. The turbine speed is reduced to a speed appropriate for propeller blades 18 and 21 by a gear system 115. When the fan blades are carried by rings 22, spacers 60A analogous to the spacers of the present invention, or analogous to bosses 101 can be used. In either case, the invention functions to maintain substantial circularity of rings 22 when a blade is lost.

What is claimed is:

1. An aircraft propulsion system comprising:
   (a) an array of propeller blades extending from an annular carrier and
   (b) non-deformable limit means disposed at a location of each propeller blade and rotatable therewith for limiting deformation of the carrier if centrifugal loading becomes unbalanced and said limit means being disposed at a spacing from said annular carrier for reducing impact energy if centrifugal loading becomes unbalanced.

2. A system according to claim 1 in which the limit means comprises an array of anvils surrounded by the carrier.

3. Apparatus for use in a gas turbine engine having a radial array of propeller blades extending from a ring which surrounds, and rotates at the same speed as, a turbine stage, comprising:
   (a) at least one anvil disposed at a location of each propeller blade for resting upon a casing of the turbine stage and
   (b) means for fastening the at least one anvil to the casing, the at least one anvil being rotatable with an associated propeller blade.

4. An aircraft propulsion system comprising:
   (a) a turbine stage having an outer casing;
   (b) a ring surrounding the turbine stage and defining a generally annular space between the ring and the casing;
   (c) a plurality of propeller blades fastened to the ring in radial array; and
   (d) at least one spacer disposed at a location of each propeller blade and rotatable in association therewith, the at least one spacer reducing the height of the annular space in the region of a propeller blade.

5. In an aircraft propulsion system which comprises a radial array of propeller blades supported by a ring which surrounds a turbine and in which, during abnormal operating conditions, the ring deforms from its initial shape, the improvement comprising:
   (a) a rigid frame surrounded by the ring; and
   (b) limit means connected to the frame at a location of each propeller blade and rotatable in association therewith for limiting the deformation of the ring and said limit means being disposed at a spacing from the ring for reducing impact energy if a propeller blade breaks loose during operation.

6. An aircraft propulsion system comprising:
   (a) a turbine stage;
   (b) a casing surrounding the turbine stage;
   (c) one or more stiffening discs surrounding the casing;
   (d) a ring-like structure surrounding the casing and defining an annular space therebetween;
   (e) a radial array of propeller blades fastened to the ring-like structure;
   (f) limit means collocated with the array of propeller blades and rotatable in association therewith for limiting travel of the ring-like structure through the space upon breakage of at least one of the propeller blades of the radial array.

7. An aircraft propulsion system comprising:
   (a) a turbine stage;
   (b) an array of propeller blades surrounding the turbine stage and rotating at the same speed as the turbine stage;
   (c) a floating mount connecting the propeller array with the turbine stage for
      (i) transmitting the thrust load of the propellers to the turbine stage;
      (ii) transmitting power from the turbine to the propellers;
      (iii) accommodating relative thermal growth between the propellers and the turbine; and (d) limit means associated with each of the propeller blades and rotatable in coordination therewith for assisting the floating mount in resisting radially inward travel of the floating mount if one of the propeller blades becomes damaged and the floating mount becomes unbalanced.

8. An aircraft propulsion system comprising:
(a) an array of rotatable propeller blades surrounding a turbine flowpath;
(b) an annual carrier which
  (i) surrounds the flowpath;
  (ii) supports the propeller blades;
  (iii) deforms in shape when centrifugal force applied by the propellers becomes unbalanced; and
(c) means collocated along the flowpath with the propeller blades and rotatable in coordination therewith for limiting the deformation.

9. An aircraft propulsion system comprising:
(a) a rotatable turbine having a generally circular casing,
(b) a stiffening rib surrounding and fastened to the casing,
(c) a polygonal ring surrounding the casing which:
  (i) rotates in the same direction as the casing,
  (ii) carries a radial array of propfan blades which apply a symmetrical centrifugal load to the ring,
  (iii) is urged into a substantially symmetrical shape by the centrifugal load and,
(d) protection means which is collocated with the array of propfan blades and
  (i) is fastened to the stiffening rib,
  (ii) contacts the polygonal ring when the symmetrical centrifugal loading becomes nonsymmetrical, and
  (iii) prevents further deformation of the polygonal ring after the contact of (d) (ii) by applying a restoring force originating from the rib.

10. An aircraft propulsion system, comprising:
(a) an array of propeller blades extending from an annular carrier;
(b) a turbine stage with a casing enclosing a plurality of turbine blades;
(c) means for coupling said turbine stage to said annular carrier to cause rotation of said array of propeller blades in response to rotation of said turbine stage; and
(d) non-deformable limit means disposed at a location of each propeller blade and rotatable therewith for limiting deformation of said annular carrier when centrifugal loading becomes unbalanced.

11. The aircraft propulsion system of claim 10, wherein said coupling means includes a gear system to reduce a speed of rotation of said propeller blades relative to a speed of rotation of said turbine stage.

12. The aircraft propulsion system of claim 10, wherein said limit means comprises an array of sets of spacers, each set respectively disposed about said carrier at the location of each propeller blade.

13. The aircraft propulsion system of claim 12, wherein a set of spaces includes four spacers positioned relative to one another to define corners of a rectangle.

* * * * *